W. D. CUTLER.
Shearing Sheep Skins.
No. 32,184. Patented April 30, 1861.
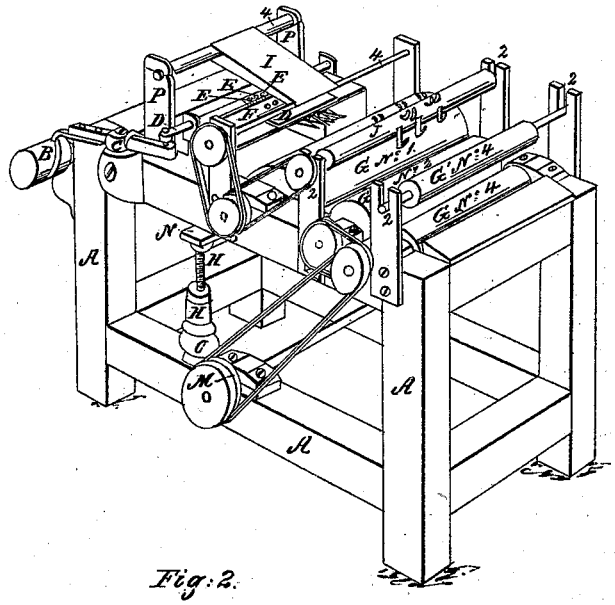
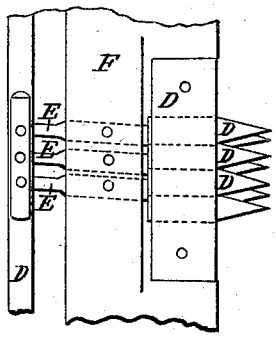
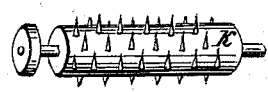
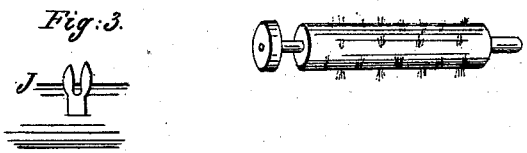
Witnesses:
Elias Forbes
H. E. Rockwell
Inventor:
William D Cutler

UNITED STATES PATENT OFFICE.

WILLIAM D. CUTLER, OF MILLBURY, MASSACHUSETTS.

SHEARING SHEEPSKINS.

Specification of Letters Patent No. 32,184, dated April 30, 1861.

*To all whom it may concern:*

Be it known that I, WILLIAM D. CUTLER, of Millbury, in the county of Worcester and State of Massachusetts, have invented a new and useful Machine for Shearing the Wool from Sheep Skins or Pelts, called "Cutler's Sheepskin - Shearing Machine;" and I do hereby declare that the following is a full, clear, and exact description of the construction and operation of the same, reference being had to the annexed drawings, making a part of this specification, in which—

Figure 1 is a perspective view. Fig. 2 a sectional view of cutters. Fig. 3 a sectional view of hook teeth used on roll in Fig. 1.

The nature of my invention consists in providing a machine with such mechanical devices that upon placing a sheep skin thereon and putting the machine in operation the wool will be cut close to the hide in a fleece without injuring the wool or the skin.

To enable others skilled in the art to make and use my invention, I will proceed to describe its construction and operation.

I construct a frame of wood or iron in any known form, and apply thereto rollers and cutters and cross plate shaft pulley belt, with power and other apparatus for shearing and pulling the wool when too short to shear and for cleaning the hides of burs and taking the wool off in a whole fleece.

A A A is the frame of wood or iron, as shown in Fig. 1, which has the different parts of machinery applied to it; B, the cam and shaft at the end of the machine, with pulley to drive it and groove cut in cam B to admit the follower on bar C, that is connected to the machine A, thence being connected to rod D, as shown in Fig. 2, which operates back and forth by means of the follower running in groove of cam B, thence being connected to blades of steel E E E in Fig. 2, that are made fast to plate F in Fig. 2, by means of screws and operated in a back and forth motion. Plate F in Fig. 2 has each of its ends bent at a right angle and each end is made fast to the machine by screws. In plate F, Fig. 2, I cut a space out wide enough to admit plate D in Fig. 2 and stationary cutters D D D, which come close to blades E E E, as shown in Fig. 2, and are made fast to plate F by pins and operated back and forth against stationary cutters D D D in cutting the wool from the hides as it passes over the rolls G, No. 4, G, No. 2, and G, No. 1 and under the roll G', No. 4 to the cutters E E E and D D D.

N is a piece passing under plate F for the purpose of raising and depressing of the cutters when the hides are thick or thin and for cutting the wool close or leaving it any length.

H is a screw attached to piece N passing under plate F for the purpose of raising the cutters. The studs O are for letting the screws run down into, as shown in Fig. 1.

I is an endless belt passing over rolls 4, 4, for conveying the wool off as fast as it is cut by the cutters, as shown in Fig. 1.

J is a roller with hook teeth, as shown in Fig. 1 and Fig. 3, made fast to the roll. This is to be placed on the machine in cases required, for pulling the wool when too short to shear, and in cases where the roots of the wool have become decomposed by packing one hide upon another.

K in Fig. 4 is a roll with short and sharp blades, to be used in cases required for cleaning the hides of burs and to be placed in spaces marked 2 2 in Fig. 1, when rolls J and G, No. 4 are taken from the machine.

L is a revolving brush, as shown in Fig. 5, and to be used to brush pieces of burs, and other substances from the hides and to be placed in spaces marked 2, 2, shown in Fig. 1, when rolls J and G, No. 4 are taken out of the machine; M the main shaft and pulley.

I have a piece for attaching my shears to, that crosses the machine and I cut in this a space for letting pieces of steel drop enough so that their surface will come on a level with the under part of the piece, these pieces being made fast to a plate and that plate fastened to the cross plate. I have one or more pieces of steel of different forms and lengths that are fastened to the plate and running back of plate to rod D and made fast by pins or screws and operated in a back and forth motion. I have one or more rolls for conveying the hides to the pieces of steel, one larger than the rest to be used for making the hides fast thereto, which can be fastened in different ways; the two smaller rolls are to be used as the case may require. When there are hides with burs in them then these last named rolls K and L are used. I have pulley belts for driving the same and conveying the wool skin against the different pieces of steel herein mentioned; also rolls for conveying the hides to the main cylinder marked G, No. 1, which the hides are fastened to, when in operation brings the wool against the points of the cutters and the wool is cut from the hide. Roll G, No. 2 is for keeping the hide in its place and to prevent it from going too fast on the cylinder after it has been placed on the machine. The hides being placed at the end of the machine on rolls G, No. 4, G, No. 2, are then made fast to the cylinder G, No. 1, and are ready to come in contact with the different pieces of steel that are in operation. I have for the purpose of keeping the wool in its place in an unbroken fleece two standards P P, shown in Fig. 1, at the back part of the machine raised above the rest of the machinery, with rollers 4, 4, running through an endless belt, revolving the same direction as cylinder that has the hides fastened thereto, this belt coming near to the points of the cutters and catching the wool as fast as it is cut by the cutters and conveying it off on the belt to the other parts of the machine in a whole fleece. The roll J has teeth made fast to it of forked shape and their points bent like hooks for the purpose of pulling the wool in cases required where the wool is inclined to come off when the roots of the wool have become decomposed. This roll is placed over cylinder No. 1 when required, and operated the same as the machinery on the machine. Roll K has sharp blades for the purpose of splitting the burs that are in the wool on the hides, and is placed on the machine in spaces marked 2, 2, in cases required; also roll L has brushes fastened to it for the purpose of brushing pieces of burs that are left on the hides. The machine is driven by the shaft at the under part of the machine, and the cutters by the shaft at the end of the machine.

I have herein described the construction and arrangement of machinery which I have essayed with success; but I do not wish to limit myself to the specified construction and arrangement, as these may be modified without changing the principle of my invention.

What I claim and desire to secure by Letters Patent is—

The application of cutters as described in combination with roll G, No. 1, for producing the desired effect as specified and set forth in drawings and specifications.

WILLIAM D. CUTLER.

Witnesses:
   THEODORE STAYNER,
   H. H. CHAMBERLIN.